(12) United States Patent
Chang et al.

(10) Patent No.: US 8,805,015 B2
(45) Date of Patent: Aug. 12, 2014

(54) ELECTRONIC DEVICE AND METHOD FOR MEASURING POINT CLOUD OF OBJECT

(71) Applicants: Chih-Kuang Chang, New Taipei (TW); Xin-Yuan Wu, Shenzhen (CN); Yi Liu, Shenzhen (CN)

(72) Inventors: Chih-Kuang Chang, New Taipei (TW); Xin-Yuan Wu, Shenzhen (CN); Yi Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 54 days.

(21) Appl. No.: 13/648,266

(22) Filed: Oct. 9, 2012

(65) Prior Publication Data

US 2013/0251195 A1 Sep. 26, 2013

(30) Foreign Application Priority Data

Mar. 23, 2012 (CN) .......................... 2012 1 0079307

(51) Int. Cl.
*G06K 9/00* (2006.01)
(52) U.S. Cl.
USPC ........................................................ 382/103
(58) Field of Classification Search
None
See application file for complete search history.

(56) References Cited

U.S. PATENT DOCUMENTS

| 7,933,749 | B2* | 4/2011 | Chang et al. ...................... 703/2 |
| 2003/0067461 | A1* | 4/2003 | Fletcher et al. ............... 345/420 |
| 2008/0043035 | A1* | 2/2008 | Chang et al. .................. 345/619 |
| 2009/0048782 | A1* | 2/2009 | Chang et al. ...................... 702/5 |
| 2009/0055096 | A1* | 2/2009 | Chang et al. ...................... 702/5 |
| 2009/0063105 | A1* | 3/2009 | Chang et al. ...................... 703/1 |
| 2009/0220918 | A1* | 9/2009 | Kaufmann et al. ........... 433/213 |
| 2009/0284550 | A1* | 11/2009 | Shimada et al. .............. 345/619 |
| 2010/0164951 | A1* | 7/2010 | Stewart ......................... 345/419 |
| 2010/0166294 | A1* | 7/2010 | Marrion et al. ............... 382/154 |
| 2010/0209013 | A1* | 8/2010 | Minear et al. ................. 382/260 |
| 2010/0280649 | A1* | 11/2010 | Chen et al. .................... 700/175 |
| 2013/0181983 | A1* | 7/2013 | Kitamura et al. ............. 345/419 |

* cited by examiner

*Primary Examiner* — Jason M Repko
*Assistant Examiner* — Shervin Nakhjavan
(74) *Attorney, Agent, or Firm* — Novak Druce Connolly Bove + Quigg LLP

(57) ABSTRACT

A method obtains an original point-cloud of the object, filters discrete points from the original point-cloud, determines a first sub-point-cloud and a second sub-point-cloud from the filtered point-cloud, and creates an updated point-cloud of the object based on the first sub-point-cloud and the second sub-point-cloud, determines points to be fitted from the updated point-cloud. The method further fits a figure according to the determined points, determines a reference figure according to the fitted figure, determines a first point from the first sub-point-cloud and a second point from the second-point-cloud, calculates a gap width and a gap height of the updated point-cloud according to the first determined point, the second determined point, and the reference figure, and displays the gap width and the gap height on a display device.

18 Claims, 13 Drawing Sheets

ELECTRONIC DEVICE AND METHOD FOR MEASURING POINT CLOUD OF OBJECT

BACKGROUND

1. Technical Field

Embodiments of the present disclosure relate to measurement technology, and particularly to an electronic device and method for measuring a point cloud of an object using the electronic device.

2. Description of Related Art

Measurement is an important phase in manufacturing and is closely related to product quality. Point cloud obtaining devices have been used to obtain a point cloud of an object by scanning a large number of points on a surface of the object, processing the data in the point cloud, and subsequently calculating a gap width and a gap height of the point cloud of the object.

However, a user has to manually filter discrete points from the point cloud, draw a reference figure of the filtered point cloud, and select specified points from the filtered point cloud, so as to calculate the gap width and the gap height of the point cloud of the object. Because the point cloud of the object includes a large number of points, it is a time-consuming work to find the specified points manually as mentioned above. Therefore, a more efficient method for measuring a gap width and a gap height of a point cloud of an object is desired.

DETAILED DESCRIPTION

All of the processes described below may be embodied in, and fully automated via, functional code modules executed by one or more general purpose electronic devices or processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive, or other suitable storage medium.

Figure 1:
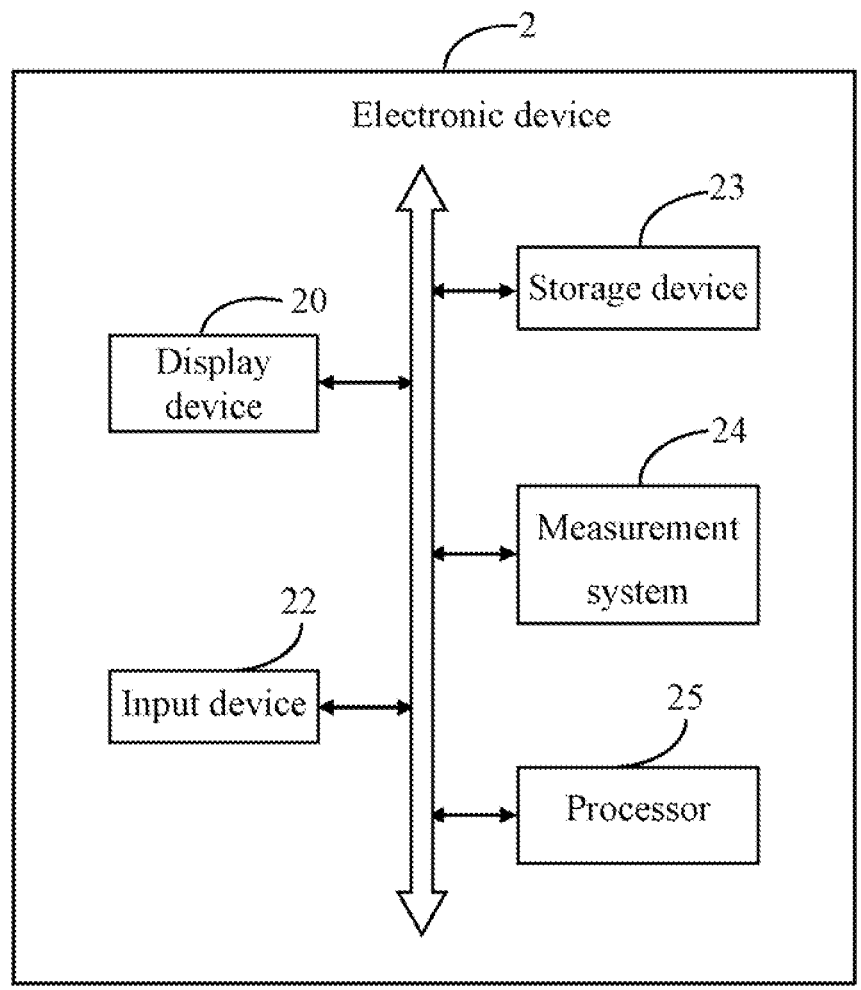
FIG. 1 is a block diagram of one embodiment of an electronic device including a measurement system.

FIG. 1 is a block diagram of one embodiment of an electronic device 2 including a measurement system 24. In the embodiment, the electronic device 2 further includes a display device 20, an input device 22, a storage device 23, and at least one processor 25. It should be understood that FIG. 1 illustrates only one example of the electronic device 2 that may include more or fewer components than illustrated, or a different configuration of the various components in other embodiments. The electronic device 2 may be a computer, a server, or any other computing device.

The display device 20 may be a liquid crystal display (LCD) or a cathode ray tube (CRT) display used to display a point-cloud of an object needs to be measured, and the input device 22 may be a mouse or a keyboard used to input computer readable data. The storage device 23 may store the point-cloud of the object and other measurement data of the object.

The measurement system 24 is used to automatically filter discrete points from the point-cloud of the object, draw a reference figure, determine points of measurement (measurement points) from the filtered point-cloud, and calculate a gap width and a gap height of the point-cloud of the object. In one embodiment, the measurement system 24 may include computerized instructions in the form of one or more programs that are executed by the at least one processor 25 and stored in the storage device 23 (or memory). A detailed description of the measurement system 24 will be given in the following paragraphs.

Figure 2:
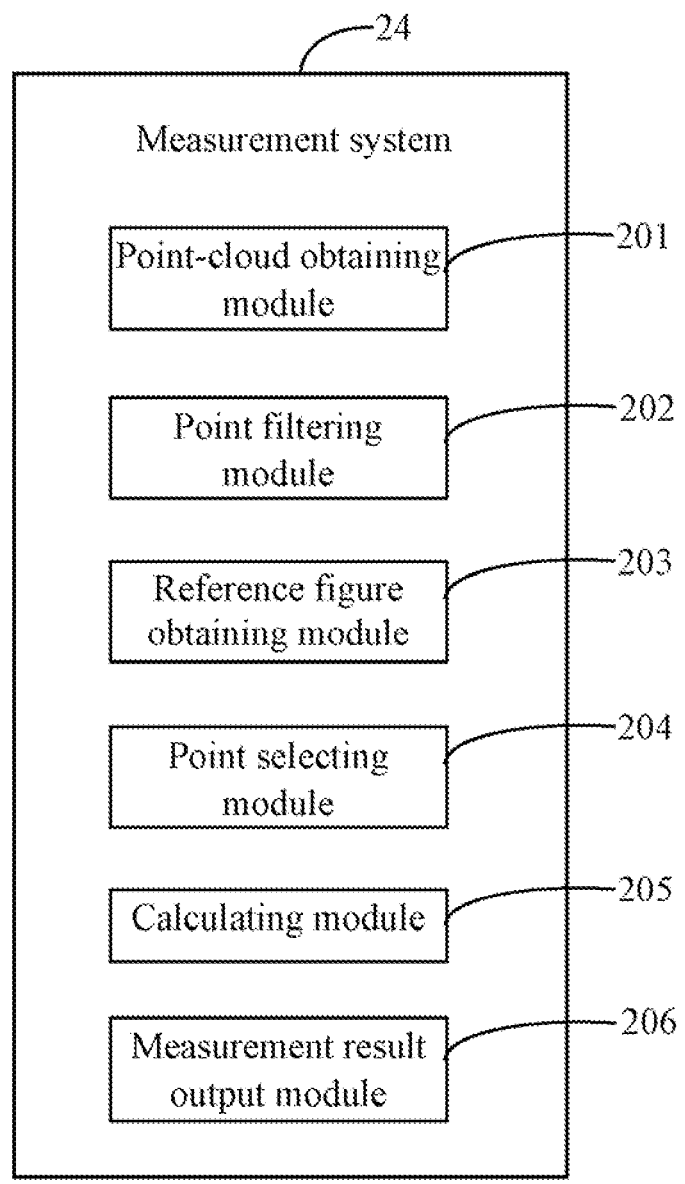
FIG. 2 is a schematic diagram of function modules of the measurement system included in the electronic device.

FIG. 2 is a schematic diagram of function modules of the measurement system 24 included in the electronic device 2. In one embodiment, the measurement system 24 may include one or more modules, for example, a point-cloud obtaining module 201, a point filtering module 202, a reference figure obtaining module 203, a point selecting module 204, a calculating module 205, and a measurement result output module 206.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, flash memory, and hard disk drives.

Figure 3:
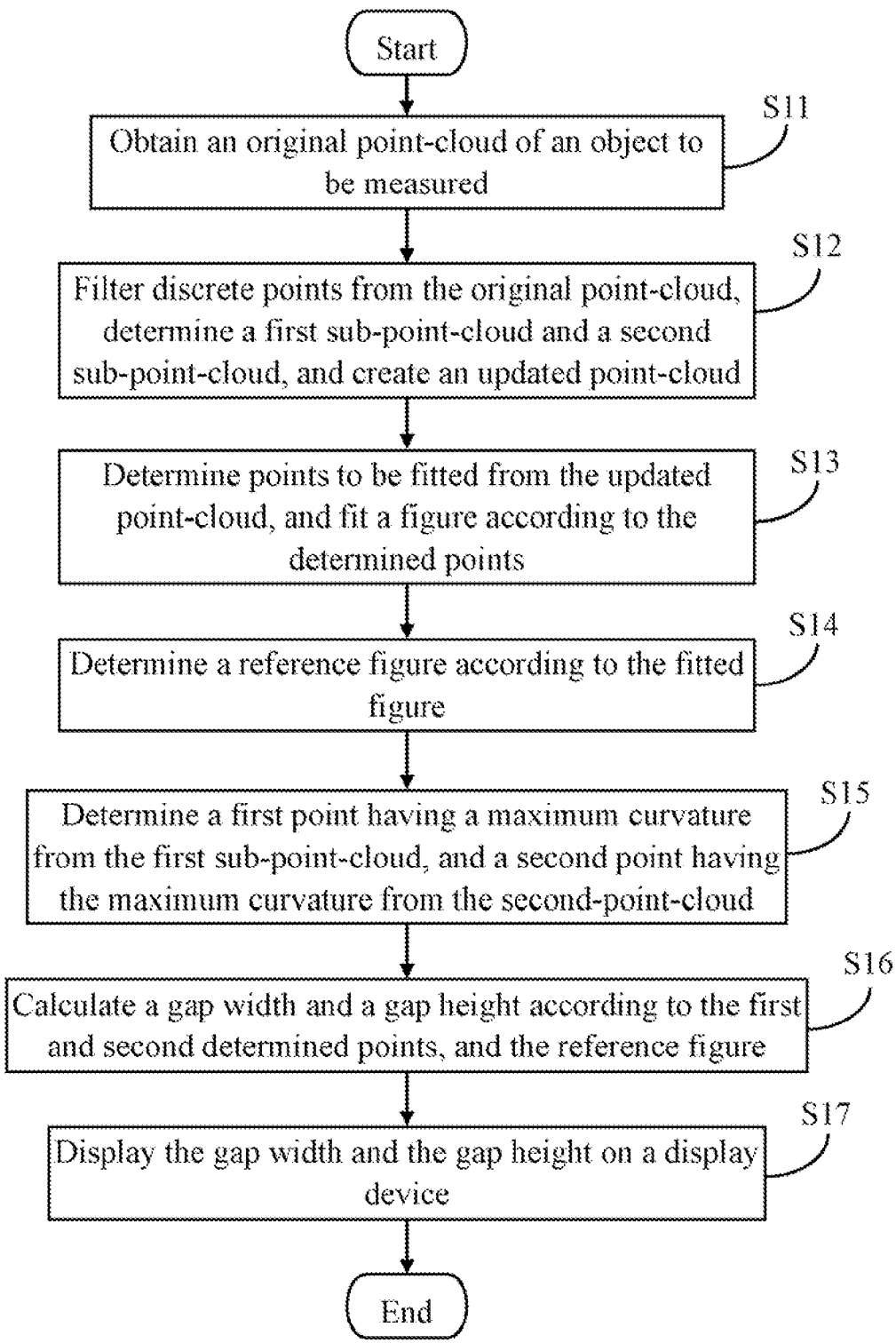
FIG. 3 is a flowchart of one embodiment of a method for measuring a gap width and a gap height of a point cloud of an object using the electronic device.

FIG. 3 is a flowchart of one embodiment of a method for measuring a gap width and a gap height of a point-cloud of an object using the electronic device 2. Depending on the embodiment, additional steps may be added, others removed, and the ordering of the steps may be changed.

Figure 4:
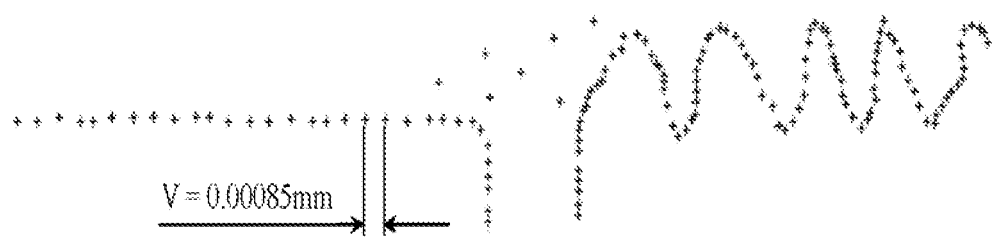
FIG. 4 is an exemplary schematic diagram of an original point cloud of an object.

In step S11, the point-cloud obtaining module 201 obtains an original point-cloud of an object from the storage device 23. In one embodiment, the original point-cloud includes raw data representing points which has not been processed by the electronic device 2. An example of an original point-cloud is shown in FIG. 4.

In step S12, the point filtering module 202 filters discrete points from the original point-cloud according to a preset distance range, determines a first sub-point-cloud and a second sub-point-cloud from the residual point-cloud after filtering discrete points (filtered point-cloud), and creates an updated point-cloud based on the first sub-point-cloud and the second sub-point-cloud. A detailed description is provided as follows.

Figure 5:
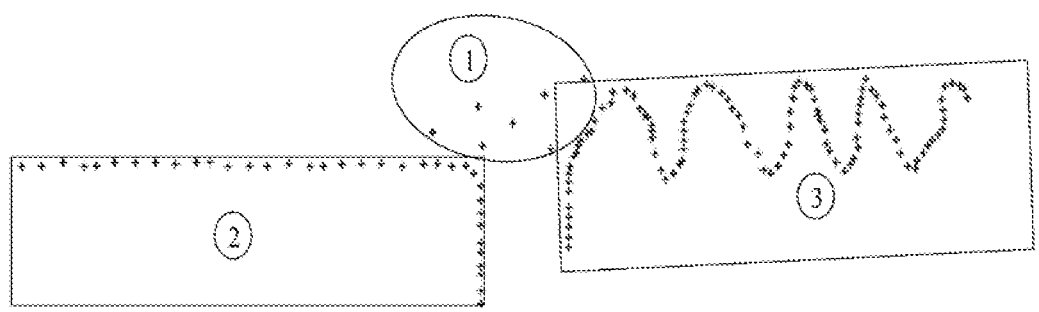
FIG. 5 is an exemplary schematic diagram of dividing the original point cloud into one or more sub-point-clouds.

The point filtering module 202 calculates a distance between every two points in the original point-cloud, adds two points to a sub-point-cloud if the distance between the two points falls in the preset distance range, and obtains one or more sub-point-clouds. In one embodiment, the preset distance range is defined as [0, 0.001 mm]. The point filtering module 202 deletes the pairs of discrete points with distances not inside the preset distance range. For example, as shown in FIG. 5, the points in the first block are determined as the discrete points, and are deleted by the point filtering module 202.

If a number of the sub-point-clouds is greater than two, the point filtering module 202 determines a first sub-point-cloud and a second sub-point-cloud according to the number of the points in each sub-point-cloud, and creates an updated point-cloud by merging the first sub-point-cloud and the second sub-point-cloud. In one embodiment, the sub-point-cloud having the highest number of points is determined as the first sub-point-cloud, and the sub-point-cloud having the second-highest number of the points is determined as the second sub-point-cloud.

Figure 6:
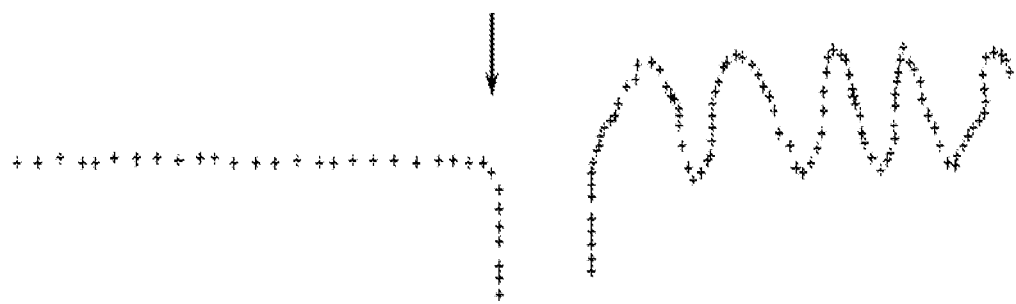
FIG. 6 is an exemplary schematic diagram of merging a first sub-point-cloud and a second sub-point-cloud of the one or more sub-point-clouds to form an updated point cloud.

If the number of the sub-point-clouds is only one, the procedure ends. If the number of the sub-point-clouds is two, the point filtering module 202 directly merges the two sub-point-clouds and forms an updated point-cloud. For example, as shown in FIG. 5, the points in the first block are deleted, and the residual points in the second block and the third block are merged, and an updated point-cloud is formed which is shown in FIG. 6.

In step S13, the reference figure obtaining module 203 determines points to be fitted (reference points) from the updated point-cloud, and fits a figure according to the determined points. In one embodiment, the fitted figure includes, but is not limited to, a fitted straight line or a fitted plane. A detailed description is as follows.

The reference figure obtaining module 203 calculates a curvature of a connection line of every two points in the updated point-cloud, and adds specified points to a point group if a change of the curvature of the connection line of the specified points is less than a preset value (e.g., 0.01), so as to determine one or more such kinds of point groups. In one embodiment, the curvature of the connection line is determined as a tangent value of an included angle between the connection line and a horizontal axis (e.g., an X-axis) of a coordinate system.

Figure 7:
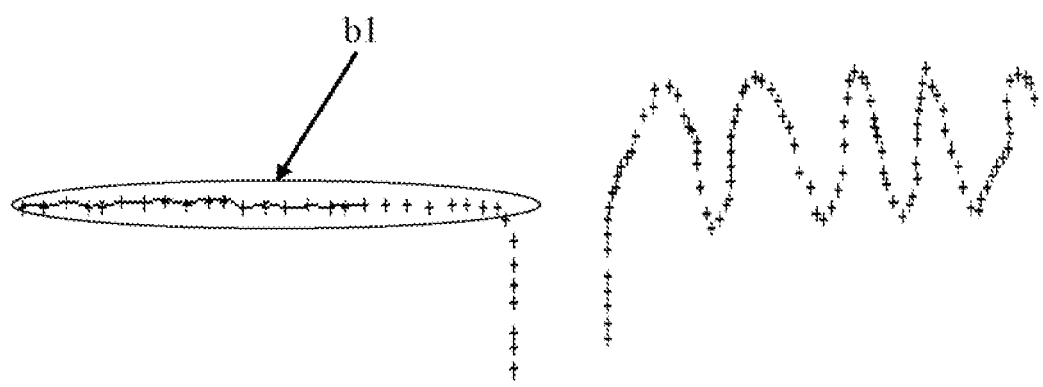
FIG. 7 is an exemplary schematic diagram of determining specified points to be fitted from the updated point cloud.
Figure 8:
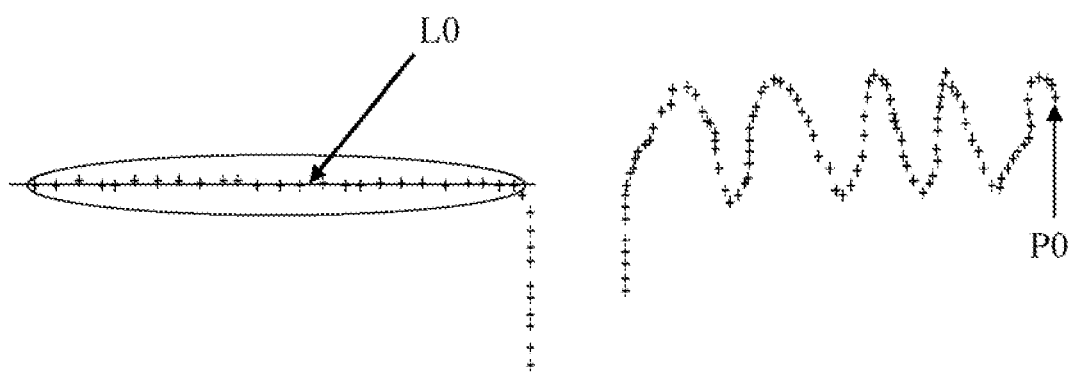
FIG. 8 is an exemplary schematic diagram of fitting a straight line using the determined points in FIG. 7.

In one embodiment, if a number of the determined point groups is one, the reference figure obtaining module 203 fits the points (reference points) in the single determined point group to a straight line. For example, as shown in FIG. 7, only one point group "b1" is determined, thus a straight line "L0" can be fitted as shown in FIG. 8. If the number of the determined point groups is greater than or equal to two, the reference figure obtaining module 203 fits a plane using the points (reference points) in all the determined point groups.

Figure 9:
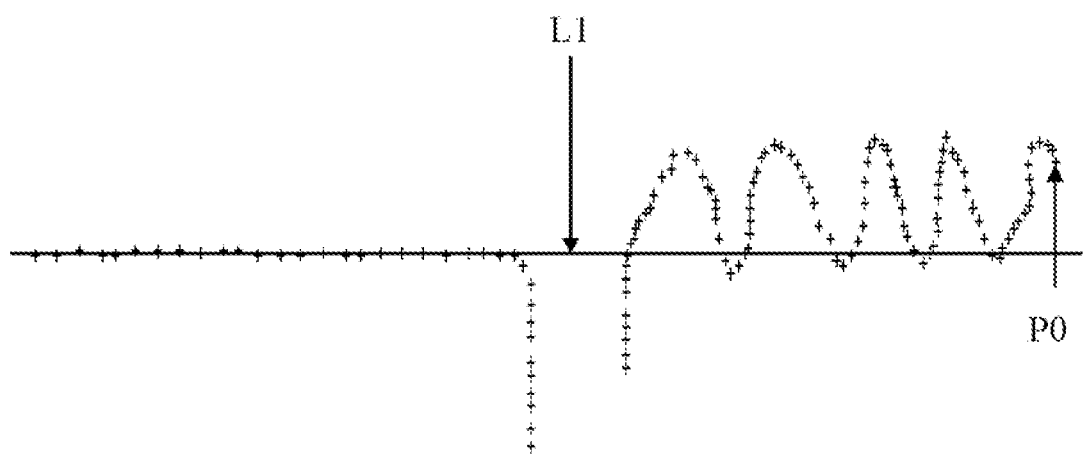
FIG. 9 is an exemplary schematic diagram of determining a reference straight line according to the fitted straight line in FIG. 8.

In step S14, the reference figure obtaining module 203 determines a reference figure according to the fitted figure. In one embodiment, the reference figure includes, but is not limited to, a reference straight line or a reference plane. In detail, the reference figure is obtained by extending the fitted figure until the fitted figure extends beyond a preset distance (e.g., five millimeters) of a boundary of the updated point-cloud. The boundary of the updated point-cloud is determined as the point having the farthest distance from the fitted figure along the horizontal axis (e.g., the X-axis) of the coordinate system. For example, as shown in FIG. 8, the point "P0" represents the boundary of the updated point-cloud. As shown in FIG. 9, "L1" represents the reference straight line extended from the fitted straight line "L0".

Figure 10:
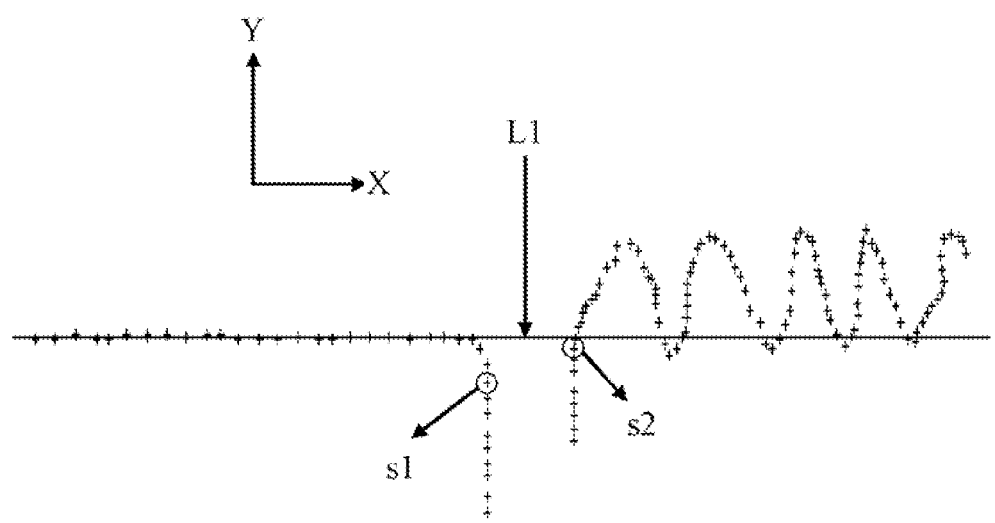
FIG. 10 is an exemplary schematic diagram of determining measurement points in the updated point cloud.

In step S15, the point selecting module 204 determines a first point having a maximum curvature from the first sub-point-cloud, and determines a second point having the maximum curvature from the second-point-cloud. In one embodiment, the first determined point and the second determined point are regarded as measurement points from which to measure the gap width of the updated point-cloud of the object. For example, as shown in FIG. 10, "s1" represents the first determined point, and "s2" represents the second determined point.

In one embodiment, a curvature of a point is determined as a tangent value of an included angle between a connection line of the point and a previous point, and the reference figure. For example, suppose that "$\alpha$" represents the included angle between the connection line and the reference figure, thus the curvature of the points is determined as $\tan(\alpha)$.

If a number of the first determined points and/or a number of the second determined points is greater than one, the point selecting module 204 calculates a horizontal distance between each first determined point and each second determined point along the horizontal axis (e.g., the X-axis) of the coordinate system, and selects a first determined point and a second determined point having the smallest horizontal distance between them as the measurement points. For example, suppose that the first determined points include "s11", "s12", and "s13", the second determined points include "s21", "s22", and "s23"; where the horizontal distance between the first determined point "s12" and the second determined point "s22" is the smallest distance, then the first determined point "s12" and the second determined point "s22" are determined as the measurement points on which measurements are to based. That is, the point "s12" is determined as a final first determined point, and the point "s22" is determined as a final second determined point.

In step S16, the calculating module 205 calculates a gap width and a gap height of the updated point-cloud of the object according to the first determined point, the second determined point, and the reference figure. The gap width and the gap height of the updated point-cloud of the object is determined as the gap width and the gap height of the original point-cloud of the object.

Figure 11:
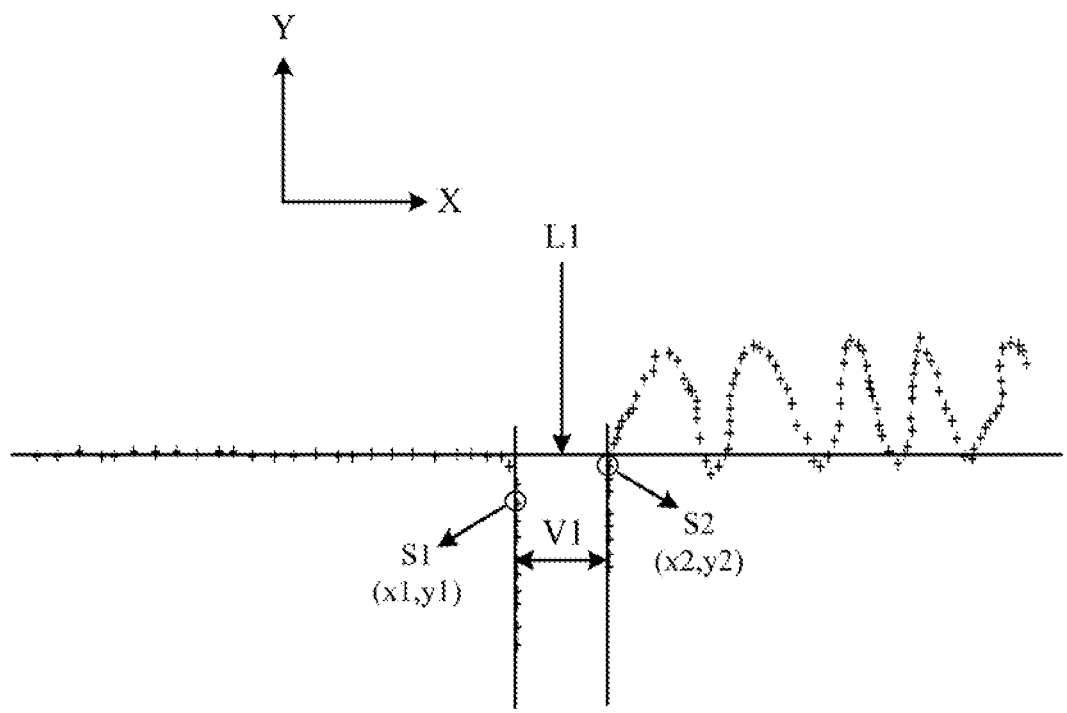
FIG. 11 is an exemplary schematic diagram of calculating a gap width of the updated point cloud.

In one embodiment, the gap width of the updated point-cloud is determined as a horizontal distance between the first determined point and the second determined point along the horizontal axis (e.g., the X-axis) of the coordinate system. For example, as shown in FIG. 11, suppose that (x1, y1) represents coordinates of the first determined point "s1", and (x2, y2) represents coordinates of the second determined point "s2", then "V1" represents the gap width of the updated point-cloud, that is, V1=|x1−x2|.

Figure 12:
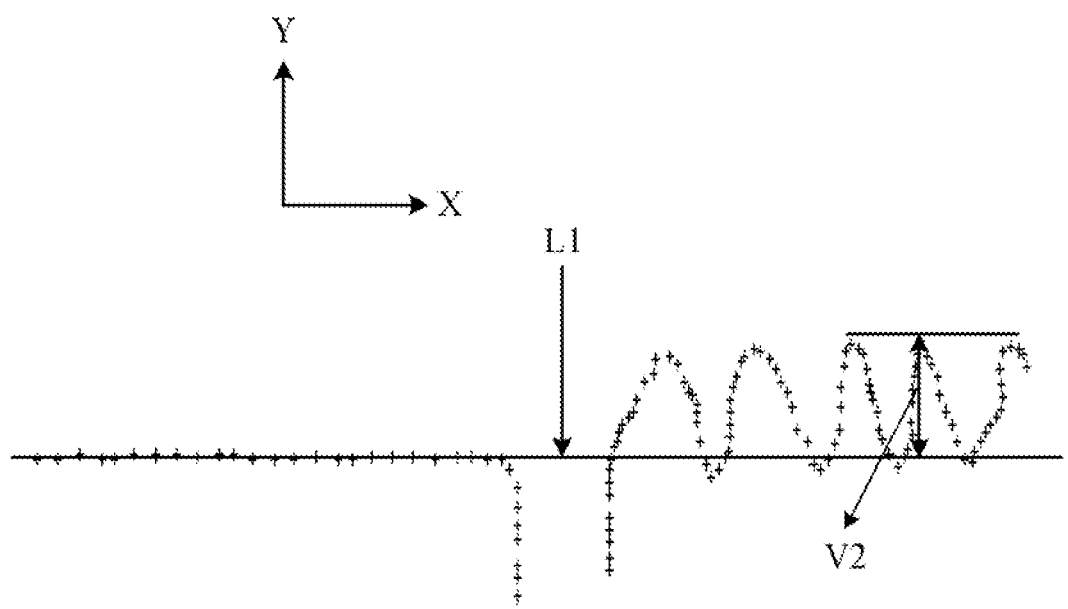
FIG. 12 is an exemplary schematic diagram of calculating a gap height of the updated point cloud.

In one embodiment, the gap height of the updated point-cloud is determined as a maximum distance between each point in the updated point-cloud and the reference figure. For example, as shown in FIG. 12, "V2" represents the gap height of the updated point-cloud of the object.

Figure 13:
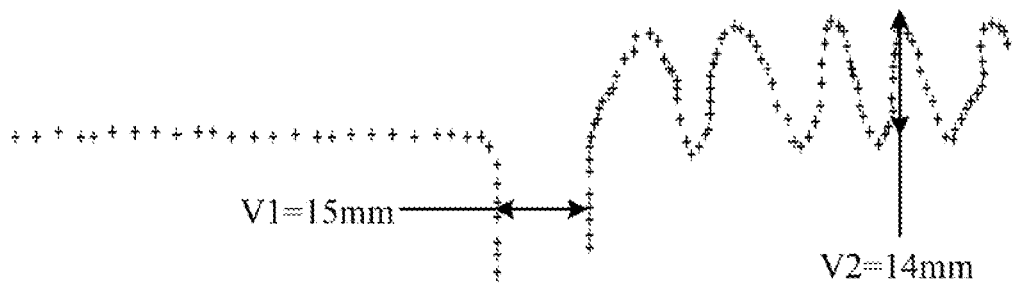
FIG. 13 is an exemplary schematic diagram of outputting measurement results.

In step S17, the measurement result output module 206 displays the gap width and the gap height on the display device 20. For example, as shown in FIG. 13, the gap width "V1" equals fifteen millimeters (i.e., V1=15 mm), and the gap height "V2" equals fourteen millimeters (i.e., V1=14 mm).

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computerized-implemented method for measuring a point-cloud of an object using an electronic device comprising a processor, the method comprising:
    obtaining an original point-cloud of the object from a storage device of the electronic device;
    filtering discrete points from the original point-cloud, determining a first sub-point-cloud and a second sub-point-cloud from the filtered point-cloud, and creating an updated point-cloud of the object based on the first sub-point-cloud and the second sub-point-cloud;
    determining points to be fitted from the updated point-cloud, and fitting a figure according to the determined points;
    determining a reference figure according to the fitted figure;
    determining a first point having a maximum curvature from the first sub-point-cloud, and determining a second point having the maximum curvature from the second-point-cloud;
    calculating a gap width and a gap height of the updated point-cloud of the object according to the first determined point, the second determined point, and the reference figure; and
    displaying the gap width and the gap height on a display device of the electronic device.

2. The method according to claim 1, wherein the updated point-cloud of the object is created by:
    calculating a distance between every two points in the original point-cloud, adding two points to a sub-point-cloud upon the condition that the distance between the two points falls in a preset distance range, and obtaining one or more sub-point-clouds;
    deleting the pairs of discrete points with distances not inside the preset distance range;
    creating the updated point-cloud by merging two sub-point-clouds directly upon the condition that a number of the sub-point-clouds is two; or
    determining a first sub-point-cloud having the highest number of points and a second sub-point-cloud having the second-highest number of the points upon the condition that the number of the sub-point-clouds is greater than two, and creating the updated point-cloud by merging the first sub-point-cloud and the second sub-point-cloud.

3. The method according to claim 1, wherein the fitted figure is obtained by:
    calculating a curvature of a connection line of every two points in the updated point-cloud, adding specified points to a point group upon the condition that a change of the curvature of the connection line of the specified points is less than a preset value, and determining one or more point groups;
    fitting the points in a single determined point group to a straight line upon the condition that a number of the determined point groups equals to one; or
    fitting the points in all the determined point groups to a plane upon the condition that the number of the determined point groups is greater than or equal to two.

4. The method according to claim 1, wherein the reference figure is obtained by extending the fitted figure until the fitted figure extends beyond a preset distance of a boundary of the updated point-cloud.

5. The method according to claim 1, further comprising:
    determining a first number of the first determined points and a second number of the second determined points;
    calculates a horizontal distance between each of the first determined points and each of the second determined points along a horizontal axis of a coordinate system upon the condition that the first number and/or the second number is greater than one; and
    selecting a first determined point and a second determined point having the smallest horizontal distance.

6. The method according to claim 1, wherein the gap width of the updated point-cloud is determined as a horizontal distance between the first determined point and the second determined point along a horizontal axis of a coordinate system, and the gap height of the updated point-cloud is determined as a maximum distance between each point in the updated point-cloud and the reference figure.

7. An electronic device, comprising:
    a storage device;
    at least one processor; and
    one or more modules that are stored in the storage device and executed by the at least one processor, the one or more modules comprising:
    a point-cloud obtaining module that obtains an original point-cloud of an object from the storage device;
    a point filtering module that filters discrete points from the original point-cloud, determines a first sub-point-cloud and a second sub-point-cloud from the filtered point-cloud, and creates an updated point-cloud of the object based on the first sub-point-cloud and the second sub-point-cloud;
    a reference figure obtaining module that determines points to be fitted from the updated point-cloud, and fits a figure according to the determined points;
    the reference figure obtaining module further determines a reference figure according to the fitted figure;
    a point selecting module that determines a first point having a maximum curvature from the first sub-point-cloud, and determines a second point having the maximum curvature from the second-point-cloud;
    a calculating module that calculates a gap width and a gap height of the updated point-cloud of the object according to the first determined point, the second determined point, and the reference figure; and
    a measurement result output module that displays the gap width and the gap height on a display device of the electronic device.

8. The electronic device according to claim 7, wherein the point filtering module creates the updated point-cloud of the object by:
    calculating a distance between every two points in the original point-cloud, adding two points to a sub-point-cloud upon the condition that the distance between the two points falls in a preset distance range, and obtaining one or more sub-point-clouds;
    deleting the pairs of discrete points with distances not inside the preset distance range;
    creating the updated point-cloud by merging two sub-point-clouds directly upon the condition that a number of the sub-point-clouds is two; or determining a first sub-point-cloud having the highest number of points and a second sub-point-cloud having the second-highest number of the points upon the condition that the number of the sub-point-clouds is greater than two, and creating the updated point-cloud by merging the first sub-point-cloud and the second sub-point-cloud.

9. The electronic device according to claim 7, wherein the fitted figure is obtained by:
calculating a curvature of a connection line of every two points in the updated point-cloud, adding specified points to a point group upon the condition that a change of the curvature of the connection line of the specified points is less than a preset value, and determining one or more point groups;
fitting the points in a single determined point group to a straight line upon the condition that a number of the determined point groups equals to one; or
fitting the points in all the determined point groups to a plane upon the condition that the number of the determined point groups is greater than or equal to two.

10. The electronic device according to claim 7, wherein the reference figure is obtained by extending the fitted figure until the fitted figure extends beyond a preset distance of a boundary of the updated point-cloud.

11. The electronic device according to claim 7, wherein the point selecting module further determining a first number of the first determined points and a second number of the second determined points, calculates a horizontal distance between each of the first determined points and each of the second determined points along a horizontal axis of a coordinate system upon the condition that the first number and/or the second number is greater than one, and selecting a first determined point and a second determined point having the smallest horizontal distance.

12. The electronic device according to claim 7, wherein the gap width of the updated point-cloud is determined as a horizontal distance between the first determined point and the second determined point along a horizontal axis of a coordinate system, and the gap height of the updated point-cloud is determined as a maximum distance between each point in the updated point-cloud and the reference figure.

13. A non-transitory storage medium having stored thereon instructions that, when executed by a processor of an electronic device, causes the electronic device to perform a method for measuring a point-cloud of an object, the method comprising:
obtaining an original point-cloud of the object from a storage device of the electronic device;
filtering discrete points from the original point-cloud, determining a first sub-point-cloud and a second sub-point-cloud from the filtered point-cloud, and creating an updated point-cloud of the object based on the first sub-point-cloud and the second sub-point-cloud;
determining points to be fitted from the updated point-cloud, and fitting a figure according to the determined points;
determining a reference figure according to the fitted figure;
determining a first point having a maximum curvature from the first sub-point-cloud, and determining a second point having the maximum curvature from the second-point-cloud;
calculating a gap width and a gap height of the updated point-cloud of the object according to the first determined point, the second determined point, and the reference figure; and
displaying the gap width and the gap height on a display device of the electronic device.

14. The non-transitory storage medium according to claim 13, wherein the updated point-cloud of the object is created by:
calculating a distance between every two points in the original point-cloud, adding two points to a sub-point-cloud upon the condition that the distance between the two points falls in a preset distance range, and obtaining one or more sub-point-clouds;
deleting the pairs of discrete points with distances not inside the preset distance range;
creating the updated point-cloud by merging two sub-point-clouds directly upon the condition that a number of the sub-point-clouds is two; or
determining a first sub-point-cloud having the highest number of points and a second sub-point-cloud having the second-highest number of the points upon the condition that the number of the sub-point-clouds is greater than two, and creating the updated point-cloud by merging the first sub-point-cloud and the second sub-point-cloud.

15. The non-transitory storage medium according to claim 13, wherein the fitted figure is obtained by:
calculating a curvature of a connection line of every two points in the updated point-cloud, adding specified points to a point group upon the condition that a change of the curvature of the connection line of the specified points is less than a preset value, and determining one or more point groups;
fitting the points in a single determined point group to a straight line upon the condition that a number of the determined point groups equals to one; or
fitting the points in all the determined point groups to a plane upon the condition that the number of the determined point groups is greater than or equal to two.

16. The non-transitory storage medium according to claim 13, wherein the reference figure is obtained by extending the fitted figure until the fitted figure extends beyond a preset distance of a boundary of the updated point-cloud.

17. The non-transitory storage medium according to claim 13, wherein the method further comprises:
determining a first number of the first determined points and a second number of the second determined points;
calculates a horizontal distance between each of the first determined points and each of the second determined points along a horizontal axis of a coordinate system upon the condition that the first number and/or the second number is greater than one; and
selecting a first determined point and a second determined point having the smallest horizontal distance.

18. The non-transitory storage medium according to claim 13, wherein the gap width of the updated point-cloud is determined as a horizontal distance between the first determined point and the second determined point along a horizontal axis of a coordinate system, and the gap height of the updated point-cloud is determined as a maximum distance between each point in the updated point-cloud and the reference figure.

* * * * *